United States Patent [19]

Kolic

[11] Patent Number: 4,768,818
[45] Date of Patent: Sep. 6, 1988

[54] DISPOSABLE LITTER PICK-UP MITT

[76] Inventor: Edwin S. Kolic, 10986 Cool Lake Ter., San Diego, Calif. 92128

[21] Appl. No.: 511,890

[22] Filed: Jul. 8, 1983

Related U.S. Application Data

[63] Continuation of Ser. No. 944,981, Sep. 22, 1978, abandoned.

[51] Int. Cl.⁴ ............................................. A01K 29/00
[52] U.S. Cl. .................................. 294/1.3; 294/1.5; 294/25
[58] Field of Search ................ 294/1 B, 1 BA, 1 BB, 294/19 R, 16, 25, 55, 1.3–1.5; 15/104.8, 257.1; 229/62, 66

[56] References Cited

U.S. PATENT DOCUMENTS

| | | | |
|---|---|---|---|
| 3,281,178 | 10/1966 | Fisher | 294/1 BA |
| 3,446,525 | 5/1969 | Jones | 294/1 BA |
| 4,078,838 | 3/1978 | Nadratowski | 294/1 BA |
| 4,132,442 | 1/1979 | Larsson | 294/1 B |
| 4,225,174 | 9/1980 | Hennessy et al. | 294/1 BA |

Primary Examiner—Johnny D. Cherry
Attorney, Agent, or Firm—Hopgood, Calimafde, Kalil, Blaustein & Judlowe

[57] ABSTRACT

The invention contemplates a disposable mitt of pliant material adapted to provide soil-protection for the hand while exposing a manipulable pocket for pickup of litter, such as dog litter. The mitt is adapted for reversal such that, once the litter is grasped via the pocket, the act of reversal closes the pocket while the hand maintains its grasp, to the point of fully enclosing the litter within the pocket before removing the hand. Remaining reversed mitt material may then be used in a circumferentially tensed wrapping of the loaded and closed pocket.

10 Claims, 2 Drawing Sheets

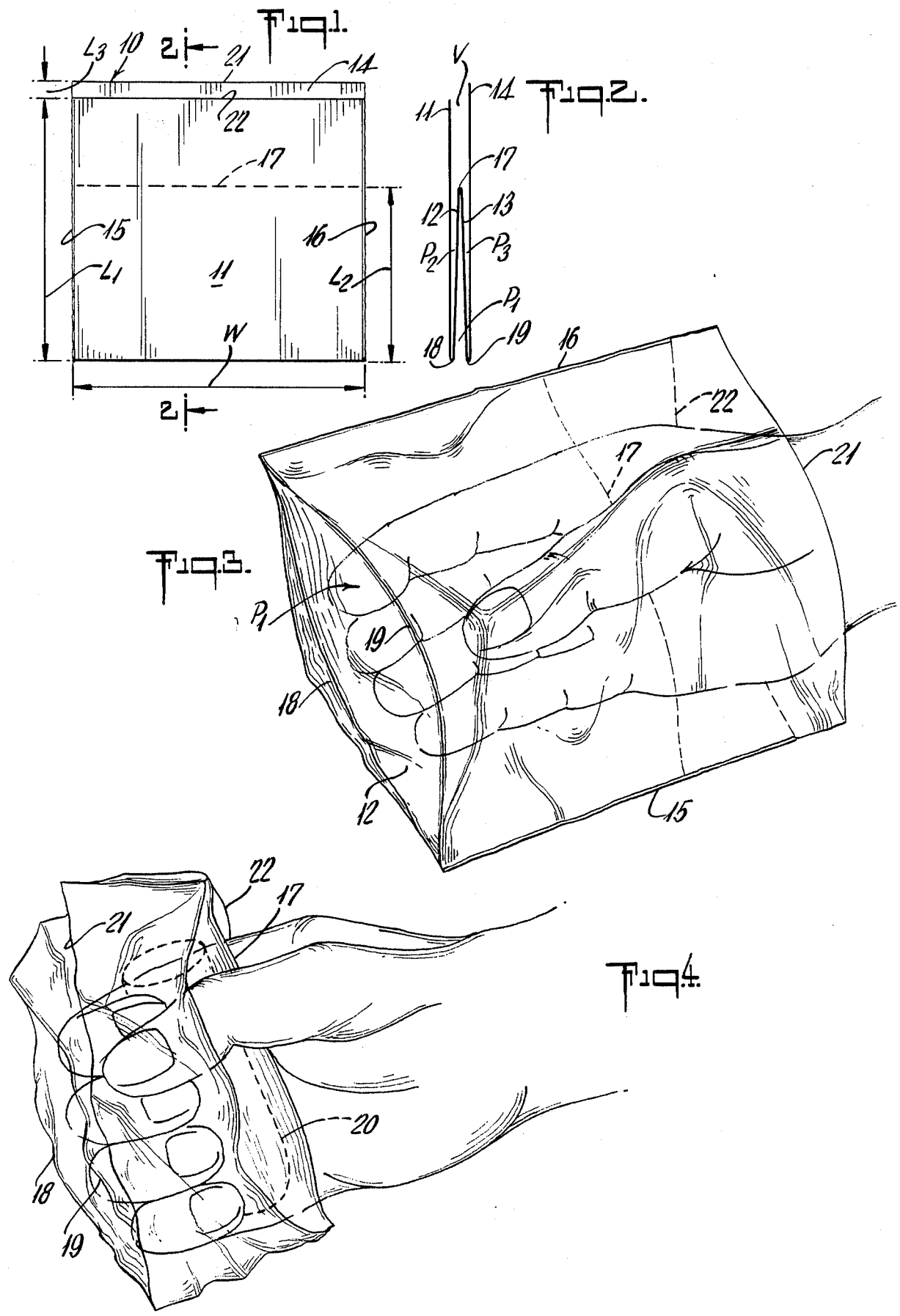

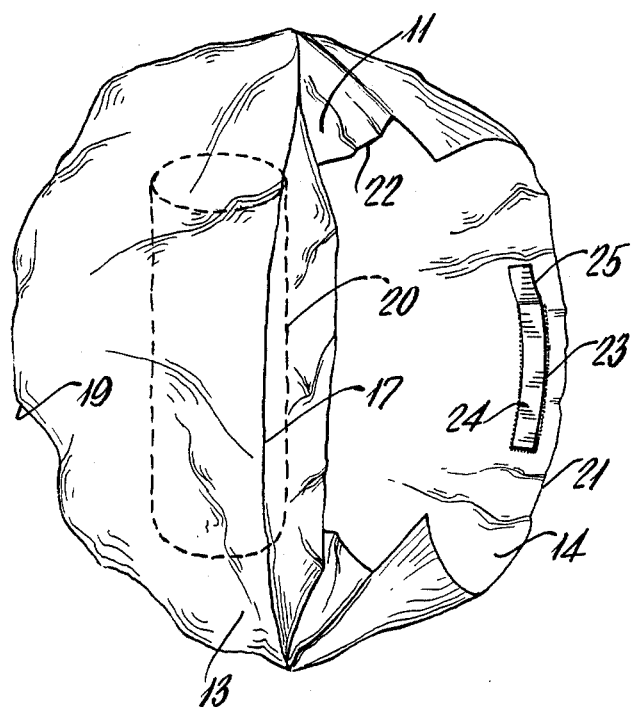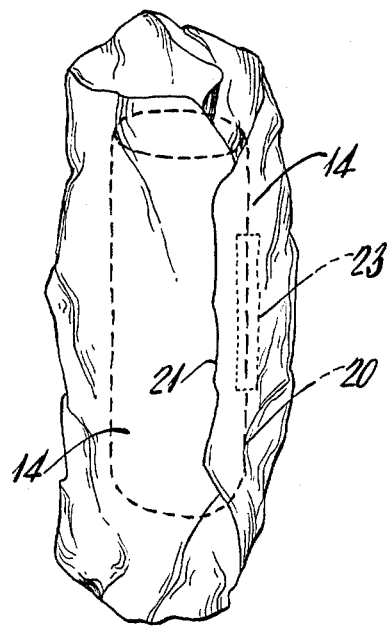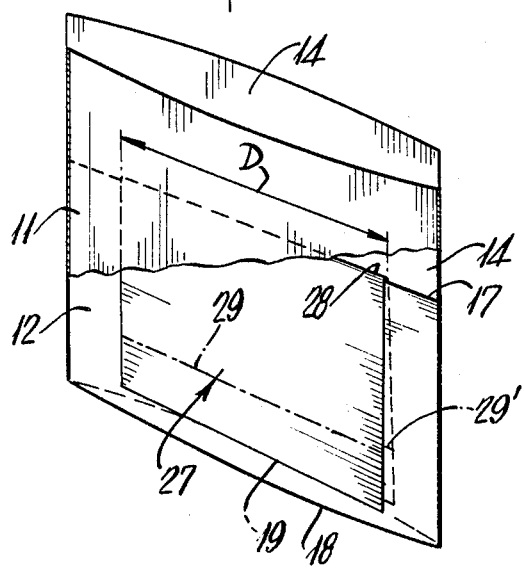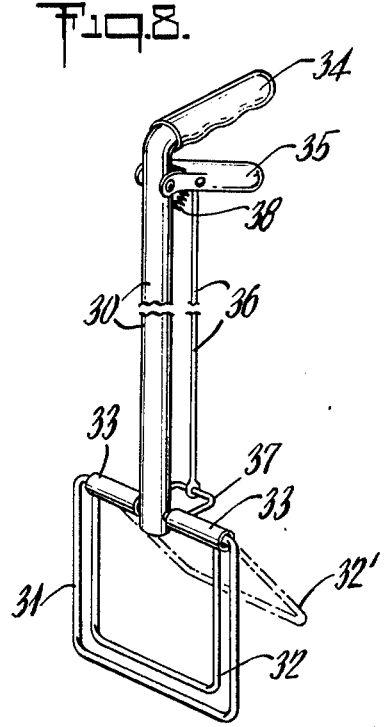

DISPOSABLE LITTER PICK-UP MITT

This is a continuation of copending application Ser. No. 944,981, filed Sept. 22, 1978, now abandoned.

This invention relates to a disposable bag in the form of a mitt, to enable ready pick-up of litter, such as dog litter.

Domestic-animal litter of streets, lawns and the like has always presented a problem of clean up, and since the problem has been largely ignored, to the offense of both pet owners and non-owners, municipalities are enacting more strict measures to force the owner to be responsible for removing his pet's litter.

It is an object of this invention to provide the pet owner with a clean and safely usable disposable wrap which will facilitate efficient and fully sealed pickup of pet litter, without soiling the hands.

It is a specific object to meet the above object with a wrap in the form of a mitt whereby the fingers and thumb of the pickup hand are inherently protected from direct contact with litter which is being or has been picked up.

A further specific object is to provide such a mitt with a litter pocket which may be manipulated for efficient grasp of litter and which may then be closed and sealed without hand exposure to the litter.

A general object is to meet the foregoing objects with a construction of elemental simplicity, lightness of weight, compactness of storage and low cost.

Other objects and various further features of the invention will be pointed out or will occur to those skilled in the art from a reading of the following specification in conjunction with the accompanying drawings. In said drawings, which show, for illustrative purposes only, a preferred form of the invention and alternative means of use thereof:

FIG. 1 is a simplified plan view of a mitt construction of the invention;

FIG. 2 is a simplified sectional view taken at 2—2 of FIG. 1, with panel elements spread slightly for better illustration of their relationship;

FIGS. 3 to 6 are perspective views to illustrate successive stages of hand-insertion, litter grasping, pocket closure, and final wrap, in use of the mitt of FIG. 1;

FIG. 7 is a simplified view in perspective to illustrate optional use of an insert in the mitt of FIG. 1; and FIG. 8 is a simplified view in perspective of a tool permitting use of the mitt of FIG. 1 without requiring the hand to be brought to ground level.

A mitt 10 as shown in FIGS. 1 and 2 is constructed from a single elongate rectangular sheet of pliant material of width W, and preferably a heat-sealable plastic, such as polyethylene, plastic-coated paper or the like. The longitudinal dimension of the sheet is folded three times, to successively define a first outer panel 11 of length $L_1$, first and second pleat or pocket panels 12–13 of length $L_2$, and a second outer panel 14 which may be of length $L_1$ but which is slightly longer, to the extent designated $L_3$. These panels are not only connected at their folds, but at their longitudinal sides, and in the case of heat-sealable material the side connections are heat-sealed. Thus, a first heat seal is designated at 15 along the left side of mitt 10 (in the sense of FIG. 1); this seal will be understood to connect the left side edges of all panels 11-12-13-14 to each other, while a second heat seal 16 similarly connects the right side edges of the same panels to each other.

The described construction will be seen to provide an externally exposed downwardly open pocket P, in the openable space between pleat panels 12–13; this pocket space is limited at its upper end by the fold edge 17 and at its longitudinal sides by the applicable regions of the side-edge heat seals 15–16. The construction will also be seen to provide a hand-accommodating volume V accessible via the opposite longitudinal end and between panels 11–14, and the hand-accommodating volume includes and communicates directly and independently with first and second digit-accommodating internal pockets $P_2$–$P_3$; the pocket space $P_2$ is limited at its lower end by the fold edge 18 between panels 11–12 and at its longitudinal sides by the applicable regions of the side-edge heat seals 15–16, and the same seal alignments define the other pocket space $P_3$ in conjunction with panels 13–14 and the fold edge 19 therebetween.

It will be appreciated that, for purposes of simplified discussion herein, consistent reference is made to "longitudinal" as being in the top-to-bottom sense of FIG. 1, because the longitudinal dimension of the initial sheet of pliant material has the extent $2(L_1+L_2)+L_3$, and of course this dimension substantially exceeds the width dimension W. This use of "longitudinal" is however not intended to indicate that the initial rectangular sheet should necessarily be first cut off from a material-supply roll of width W. For example, in mass production of the article, it is preferred that the supplied material be of width $2(L_1+L_2)+L_3$, with pleat folds being gradually formed in the course of advance to a heat-sealing location (transverse to the direction of advance), the heat-sealing operation being operative at intervals of advance to the extent W and being not only effective to seal edges and pockets as described but also to sever each article as it is completed.

FIG. 3 illustrates the initial step in use of the described mitt, a right hand being inserted in the upper-end opening between panels 11–14. Upon encountering the interior pleat-fold edge 17, the digits divide naturally, with the thumb entering the pocket $P_3$ and the fingers entering the pocket $P_2$, and it will be seen that the fold edge 17 is preferably sufficiently remote from the fold edges 18–19 (distance $L_2$) to accommodate virtually complete longitudinal insertion of all digits, i.e., about four inches. Thus inserted, manipulation of the thumb with respect to the fingers enables the user to open pocket $P_1$ to the extent needed to grasp a piece of litter, bending the ends of the thumb and fingers in a claw action to complete the grasp and to bring the litter further into pocket $P_1$.

FIG. 4 illustrates the described grasp wherein a piece of litter is shown in heavy dashed outline at 20, well within pocket $P_1$ and near the palm of the hand, being positively retained by the described claw action of the thumb and fingers. FIG. 4 also illustrates the next operational step of beginning to reverse the mitt, as by using the other hand to pull upper edges 21–22 of panels 14–11 longitudinally downward and externally of the rest of the mitt, while retaining the grasp of litter in pocket $P_1$. When the mitt has been reversed, on itself, as by bringing the reversed outer panel 14 around the previously open end of pocket $P_1$, the grasping hand is readily removed, leaving the pocket $P_1$ (and its contents) closed, with the appearance depicted in FIG. 5, wherein the originally inside fold 17 of the pleat is now externally exposed on one side of the reversed mitt. Once the pocket $P_1$ has thus been closed and the hand removed, the mitt and litter may be handled without soiling the hands, to a suitable point of disposal.

For retention of a loaded mitt in more compact form, FIG. 5 additionally shows an optional convenience feature, provided by a local coating 23 of pressure-sensitive adhesive, near the upper edge 21 of panel 14, the adhesive coating being protected by a peel-off strip or tape 24 having a free end 25 for finger-grasping to peel-off the tape and expose the adhesive. FIG. 6 shows that upon further wrapping around the loaded pocket $P_1$, the originally inner surface of panel 14 becomes the outer surface of the wrapped package, with wrapping closure completed by pressing the local adhesive coat 23 against the part of panel 14 with which it radially registers and overlaps.

In FIG. 7, the outer panel 11 has been partly broken away, to reveal a further option and employment of the mitt of FIG. 1, in that a stiffening member (or insert) 27 has been inserted, for more reinforced application of the pick-up grasp wherein the thumb and fingers apply their grasp action to the pocket $P_1$ via the insert 27. Insert 27 may be a rectangular piece of cardboard creased for a central fold to define two panels which respectively enter and longitudinally substantially fill the respective digit pockets $P_2$-$P_3$; however, the length D of the central fold 28 of insert 27 is less than the length (almost W) of the pleat fold 17 which it straddled by insert 27, thereby allowing a suitable degree of open-close manipulation of the insert-reinforced pocket $P_1$. Also in aid of manipulation is a further crease or score line 29—29' in each of the insert panels and parallel to the fold axis 28, to permit a claw-like inward bending of the outer ends of the respective panels of the insert. In use, it will be understood that, with creases 29—29' offset from the outer ends 18-19 of pocket $P_1$, to the extent of about one inch, i.e., substantially the length of thumb and finger distal phalanges bones, the claw action of thumb v. fingers may be enhanced in effectiveness of litter pickup. Once the litter has entered pocket $P_1$, and the described claw action has occurred, the same mitt-reversing procedure is employed to retain and seal the loaded mitt for disposal.

FIG. 8 illustrates a mitt-manipulating tool whereby one need not use his hand within the mitt 10, and further whereby one need not stoop over to make the pickup. The tool of FIG. 8 is basically a tong, comprising an elongate stem 30 from the lower end of which a first and fixed rectangular frame 31 (as of heavy wire) projects. A second rectangular frame 32 is hinged to the upper end of frame 31, frame 32 being also shown as of heavy wire extending from spaced sleeves 33 which are the means of hinge action about the upper transverse legs of the fixed frame 31; phantom outline 32' suggests the "open" orientation of the hinged connection of frames 31-32. At the upper end of stem 30, a laterally offset fixed handle 34 and actuating lever 35 are provided to enable remote tongs of operation of frames 31-32, the actuating connection being shown as a connecting rod 36 from lever 35 to a crank 37 secured to both sleeves 33, a compression spring 38 being shown to normally urge the tongs (31-32) to the "closed" position shown in solid outlines.

In use, and with the rectangular dimensions of frames 31-32 substantially according with those of the folded reinforcement means 27 of FIG. 7, frames 31-32 are first inserted into the upper open end of mitt 10, between panels 11-14, and lever 35 is slightly actuated to slightly expand the mitt for separate entry (a) of frame 31 into a first digit pocket ($P_2$) and (b) of frame 32 into the other digit pocket ($P_3$). When insertion is complete, lever 35 may be released, and the mitt is then retained by the closed frames 31-32, in readiness for litter pickup use. For a litter pickup, lever 35 is actuated to the extent of opening pocket $P_1$ as necessary for accommodation of the size of the litter, the tool being manipulated to place the open pocket $P_1$ over and surrounding the litter, whereupon lever 35 is released to close the loaded pocket $P_1$. Mitt reversal then proceeds as above described, the tool being thereafter removed upon suitable manipulation of lever 35; finally, wrapping may proceed as also described above.

The described mitt construction will be seen to meet all stated objects and to provide a clean and unofficious means to enable pet lovers to readily comply with applicable litter cleanup ordinances. In a specific presently preferred embodiment, the pliant material of the mitt is 1.5-mil polyethylene, but it will be understood that other materials and gauges of materials may also be used. Also, in the preferred form, dimensions are as may be deduced from the drawings, based on adult hand size, for scale effect. Thus, the dimension W may be suitably in the range of 5 ½ to 7 or 8 inches, depending on expected litter size; and the pleat length $L_2$ is preferably 3 ½ to 4 ½ inches, although a length $L_2$ of 2 ½ inches may suffice in certain cases. Since the pockets $P_1$-$P_2$-$P_3$ are of greatest importance, the provision of panels 11-14 with lengths exceeding $L_2$ is in a sense optional, although such extra length ($L_1$-$L_2$, or $L_3$-$L_2$) does provide the additional outer-panel material for more ready mitt-reversing and for more extensive circumferential wrapping of the loaded and reversed mitt.

While the invention has been described in detail for the preferred forms shown, it will be understood that modifications may be made without departing from the scope of the invention.

What is claimed is:

1. A reversible litter pick-up mitt, comprising front and back panels of pliant material connected to each other along opposed longitudinally extending sides, a pliant pleated formation fully lapped by said panels and connecting said panels along one longitudinal end and extending to and between said opposed longitudinal sides and connected to said panels along said opposed longitudinal sides for the full longitudinal extent of said pleated formation, thereby defining a hand-accommodating volume longitudinally accessible between said panels and via the opposite longitudinal end thereof, said pleated formation presenting an externally exposed pocket openable at said one longitudinal end, and said pleated formation presenting to an inserted hand first and second digit-accommodating internal pockets which are closed along three edges thereof and which are on opposite sides of said externally exposed pocket, whereby upon digit insertion in said internal pockets, said externally exposed pocket may be selectively opened and closed in the course of a litter-pick-up therein, and further whereby upon inside-out reversal of said panels, the litter pick-up mitt may be at least partially wrapped to close the externally exposed pocket prior to digit removal from the internal pockets.

2. The litter pick-up mitt of claim 1, in which said panels and pleated formation are formed from the same single elongate sheet of pliant material.

3. The litter pick-up mitt of claim 2, in which said single sheet is elongated, with the material of said pleated formation extending transversely and longitudinally between the respective panels.

4. The litter pick-up mitt of claim 1, in which the longitudinal depth of said pleated formation is in the range of 2.5 to 4.5 inches.

5. The litter pick-up mitt of claim 4, in which said longitudinal depth is approximately 4 inches.

6. The litter pick-up mitt of claim 1, in which the width of said panels and pleated formation is in the range of 5.5 to 8 inches.

7. The litter pick-up mitt of claim 6, in which said width is approximately 6 to 6.5 inches.

8. The litter pick-up mitt of claim 1, in which the longitudinal length of one of said front and back panels exceeds that of the other.

9. The litter pick-up mitt of claim 1, in which said front and back panels exceed the longitudinal length of said pleated formation.

10. The litter pick-up mitt of claim 1, in which a localized region of one of said front and back panels has a pressure-sensitive adhesive coat near the upper end thereof, and a protective peel-off element over said adhesive coat.

* * * * *